United States Patent
Kamiyama et al.

(10) Patent No.: US 7,156,124 B2
(45) Date of Patent: Jan. 2, 2007

(54) SEGMENT FOR REHABILITATING AN EXISTING PIPE AND A REHABILITATING PIPE ASSEMBLED USING SEGMENTS

(75) Inventors: Takao Kamiyama, Hiratsuka (JP); Koji Kaneta, Hiratsuka (JP); Kenji Fujii, Hiratsuka (JP)

(73) Assignee: Shonan Gosei-Jushi Seisakusho K.K. (JP)

( * ) Notice: Subject to any disclaimer, the term of this patent is extended or adjusted under 35 U.S.C. 154(b) by 0 days.

(21) Appl. No.: 11/121,263

(22) Filed: May 3, 2005

(65) Prior Publication Data

US 2005/0252565 A1   Nov. 17, 2005

(30) Foreign Application Priority Data

May 14, 2004   (JP)   ............................. 2004-144799

(51) Int. Cl.
*F16L 55/162*   (2006.01)
(52) U.S. Cl. .................... 138/98; 138/97; 405/151; 405/152
(58) Field of Classification Search ................. 138/98, 138/97, 100, 117; 405/151–153
See application file for complete search history.

(56) References Cited

U.S. PATENT DOCUMENTS

| | | | | |
|---|---|---|---|---|
| 400,262 A | * | 3/1889 | Smith ......................... | 138/100 |
| 4,799,824 A | * | 1/1989 | Kumai et al. ................ | 405/146 |
| 5,081,802 A | * | 1/1992 | Westhoff et al. ................ | 52/20 |
| 5,472,295 A | * | 12/1995 | Ikeda et al. .................. | 405/152 |
| 5,762,450 A | * | 6/1998 | Schmager ................ | 405/184.2 |
| 5,927,346 A | * | 7/1999 | Majnaric et al. ............ | 138/175 |
| 6,796,334 B1 | * | 9/2004 | Ishikawa et al. .............. | 138/98 |
| 2003/0136455 A1 | * | 7/2003 | Kamiyama et al. ........... | 138/98 |
| 2004/0108009 A1 | * | 6/2004 | Kamiyama et al. ........... | 138/97 |
| 2005/0205148 A1 | * | 9/2005 | Miura et al. .................. | 138/98 |
| 2005/0229986 A1 | * | 10/2005 | Kamiyama et al. ........... | 138/97 |
| 2005/0236058 A1 | * | 10/2005 | Kamiyama et al. ........... | 138/98 |
| 2005/0236059 A1 | * | 10/2005 | Kamiyama et al. ........... | 138/98 |
| 2005/0238437 A1 | * | 10/2005 | Kamiyama et al. ...... | 405/184.1 |
| 2005/0241713 A1 | * | 11/2005 | Kaneta et al. ................ | 138/98 |
| 2005/0248157 A1 | * | 11/2005 | Kaneta et al ............... | 285/406 |

* cited by examiner

*Primary Examiner*—James Hook
(74) *Attorney, Agent, or Firm*—Adams & Wilks

(57) ABSTRACT

A segment for rehabilitating an existing pipe has an integral structure comprised of an inner plate having an inner circumferential surface that is planar or curved with a prescribed curvature, two side plates provided upright on each side edge of the inner plate, and two end plates provided upright on each end edge of the inner plate. At least one rehabilitating plate comprising a resin sheet covers one of an outer circumferential part of the segment facing the existing pipe and the inner circumferential surface of the inner plate.

20 Claims, 8 Drawing Sheets

SEGMENT FOR REHABILITATING AN EXISTING PIPE AND A REHABILITATING PIPE ASSEMBLED USING SEGMENTS

BACKGROUND OF THE INVENTION

1. Field of the Invention

The present invention relates to a segment for rehabilitating an existing pipe, such as a sewer pipe, and a rehabilitating pipe assembled using such segments.

2. Description of the Prior Art

A method for rehabilitating an existing pipe is known from Japanese Patent Laid Open Publications No. 2003-214098 and No. 2003-286742, wherein a rehabilitating pipe is assembled to rehabilitate an existing pipe such as a sewer pipe by successively coupling segments in the circumferential direction and the pipe longitudinal direction of the existing pipe, and a gap between the outer periphery of the rehabilitating pipe and the inner wall surface of the existing pipe is filled with a filler, such as grout.

The segment, which constitutes the unit member of the rehabilitating pipe, is formed as a transparent plastic integrally molded block that is compartmentalized by an inner plate, side plates, and end plates; further, reinforcing plates and ribs are suitably provided to increase the strength of the segment.

Such a conventional segment is disadvantageous because the outer circumferential part of each segment that faces the existing pipe is nakedly exposed when assembled as the rehabilitating pipe, and, even if a filler like grout is filled between the existing pipe and the rehabilitating pipe, the filler may be directly impacted externally if the existing pipe is severely damaged, and the rehabilitating pipe may also be severely damaged because the filler is of a low strength.

It is therefore an object of the invention to provide a segment that can improve the strength of a rehabilitating pipe assembled therefrom, and to provide a rehabilitating pipe assembled using these segments.

SUMMARY OF THE INVENTION

According to the invention, a segment for rehabilitating an existing pipe comprises an inner plate having an inner circumferential surface that is planar or curved at a prescribed curvature, two side plates provided upright on each side edge of the inner plate, and two end plates provided upright on each end edge of the inner plate, wherein the inner plate, the side plates and the end plates are integrally formed of plastic and an outer circumferential part facing the existing pipe or the inner circumferential surface of the inner plate or both thereof is covered by a rehabilitating plate.

A rehabilitating pipe according to the invention is assembled by coupling segments in the circumferential direction and in the pipe longitudinal direction and filling the segments with a filler material, each of the segments comprising an inner plate having an inner circumferential surface that is planar or curved at a prescribed curvature, two side plates provided upright on each side edge of the inner plate, and two end plates provided upright on each end edge of the inner plate, wherein the inner plate, the side plates and the end plates are integrally formed of plastic and an outer circumferential part facing the existing pipe or the inner circumferential surface of the inner plate or both thereof is covered by a rehabilitating plate.

In the invention a segment is provided whose outer circumferential part facing the existing pipe and whose inner circumferential surface on the side opposite thereof are covered by a rigid rehabilitating plate. Such a structure makes the rehabilitating pipe strongly resistant to external shock and corrosion, and realizes a rehabilitating pipe that functions not merely as a repairing pipe, but rather also as a self supporting pipe that itself can be used as a sewer pipe and the like. In addition, the strength of the segment can be improved by filling the inside of the segment with a filler, such as resin mortar or cement mortar.

Further features of the invention, its nature and various advantages will be more apparent from the accompanying drawings and following detailed description of the invention.

DETAILED DESCRIPTION OF THE PREFERRED EMBODIMENTS

The present invention will be described based on preferred embodiments, referring to the attached drawings. Although the following explains an embodiment for a rehabilitating pipe constituted as a circular pipe, it is understood that the present invention can also be applied to a rehabilitating pipe whose cross sectional shape orthogonal to the pipe longitudinal direction is a shape other than a circle, such as a rectangle. The invention is also applicable in the case wherein the cross-sectional shape of the rehabilitating pipe is not a closed shape, but rather is an open shape on one side, e.g., a horseshoe shape, a semicircular shape, or a U shape. In addition, the existing pipe rehabilitated by the present invention includes various structures, such as manholes and passageways buried underground in sewer systems and the like, as well as aboveground tunnels.

Figure 1:
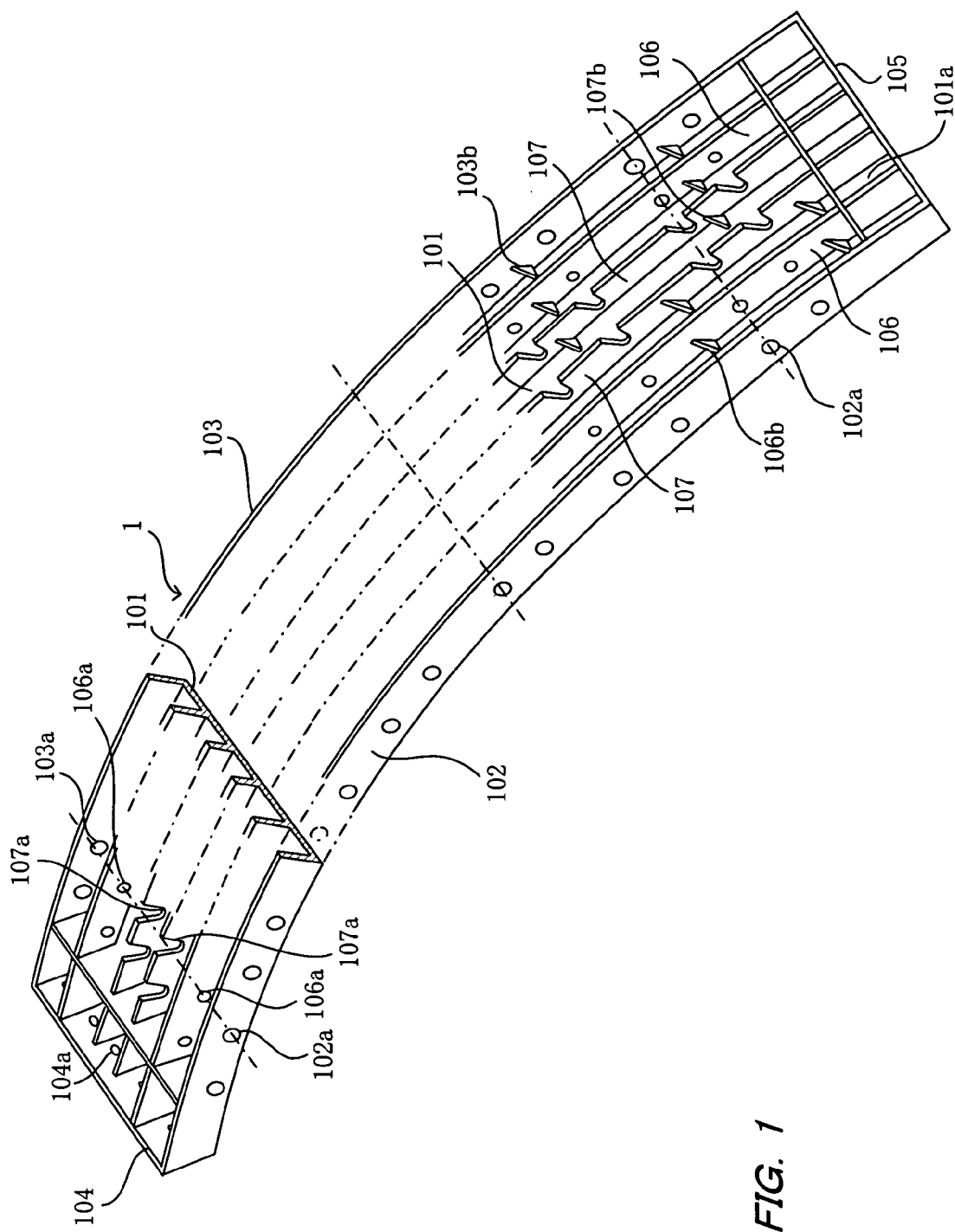
FIG. 1 is a partially broken, perspective view showing an arcuate segment.

The rehabilitating pipe of the invention is laid inside an existing pipe by coupling segments in the circumferential direction and the pipe longitudinal direction. The outer diameter of the rehabilitating pipe is smaller than the inner diameter of the existing pipe by a prescribed amount, and a segment 1 constituting the unit assembly member of the rehabilitating pipe is formed as a block. As shown in FIG. 1, the segment 1 comprises an inner plate (base plate) 101, side plates 102, 103, end plates 104, 105, and respectively two each of reinforcing plates 106, 107. These plates 101 through 107 of the segment 1 are integrally molded from a transparent, semitransparent, or opaque plastic. Thus the plates 101 through 107 define an integral structure having an open top side (i.e., side from which plates 106, 107 are accessible) and a closed bottom side on which the inner plate 101 is located. Vinyl chloride, ABS, DuraStar polymer (trade name), and the like are used as the transparent plastic, PVC, polyethylene, and the like are used as the semitransparent plastic. PVC, polyester, ABS, polyethylene, polypropylene, and the like are used as the opaque plastic.

The inner plate 101 is formed as a plate having a prescribed width and is arcuately curved at a prescribed angle, e.g., 72°, that divides the circumference into a plurality of equal parts (five parts). The bottom of the inner plate 101 forms the inner circumferential surface of the rehabilitating pipe, the circumferential direction of the arc is the circumferential direction of the rehabilitating pipe, and the latitudinal direction of the arc is the pipe longitudinal direction of the rehabilitating pipe. A plurality of rectangular openings 101a is formed respectively on each of both end parts of the inner plate 101 for performing from the inside the work in order to mutually couple the segments 1 in the circumferential direction.

The side plates 102, 103 are provided upright at a prescribed height on both side edges of the inner plate 101. A plurality of through holes 102a, 103a (herein, 14) is formed in each of the side plates 102, 103 at a prescribed interval in the circumferential direction for passing therethrough coupling members in the pipe longitudinal direction.

The end plates 104, 105 are provided upright at both end edges of the inner plate 101 at a height the same as each of the side plates 102, 103. Through holes 104a, 105a are provided at a plurality of locations in the end plates 104, 105 for passing therethrough bolts that mutually couple the segments 1 in the circumferential direction.

The reinforcing plates 106, 107 reinforce the mechanical strength of the entire segment 1, and are provided upright at a prescribed height on the top surface of the inner plate 101 on the inner sides of the side plates 102, 103. In the reinforcing plates 106, 107 are formed a plurality of through holes 106a and notched parts 107a for inserting therethrough the coupling members in the pipe longitudinal direction at a position corresponding respectively to the through holes 102a, 103a of the side plates 102, 103.

In addition, laterally projecting, small, right triangular protruding plates 103b, 106b, 107b (the protruding plates of the side plate 102 are not shown) are formed at a plurality of locations on the inside surfaces of the side plates 102, 103 and both side surfaces of the reinforcing plates 106, 107 to prevent deformation respectively thereof, thereby forming a rib structure that enhances the strength of the segment 1.

Figure 2A:
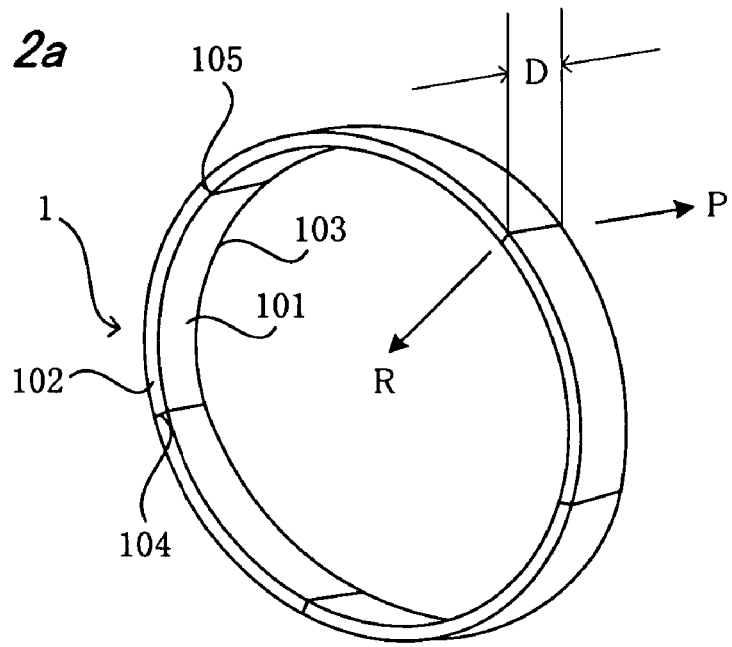
FIG. 2a is a perspective view showing a short pipe unit assembled by coupling the arcuate segments in the circumferential direction.

When the cross sectional shape of the existing pipe to be repaired is circular, the segment 1 corresponds to a block member obtained when a circular pipe having a prescribed length D as shown in FIG. 2a is cut off along the radial direction R and segmented in the circumferential direction in equal parts.

The number of reinforcing plates or the number of protruding plates can be varied in accordance with the required strength of the segment; if strong, then some or all can be omitted. In addition, because the segment functions as an optional rehabilitating member or repairing member, it is not limited to an arcuate type or fan type as shown in FIG. 1 and FIG. 2a, and can be made a parallelepipedic segment 2 as shown in FIG. 2b, in accordance with the cross sectional shape or size of the existing pipe or the repair location of the existing pipe, and can also be made a right angle or a rounded bent type segment 3.

The segments 2 and 3 are each integrally formed of plastic from inner plates 201, 301, two side plates 202, 203; 302, 303 and two end plates 204, 205; 304, 305, as is the same as the segment 1. As needed, a reinforcing plate or a rib structure for enhancing strength is also integrally provided internally. The parallelepipedic segments 2 and rounded bent type segments 3 are coupled in the circumferential direction to provide a rounded rectangular short pipe unit having the prescribed length D as shown in FIG. 2b.

Figure 2B:
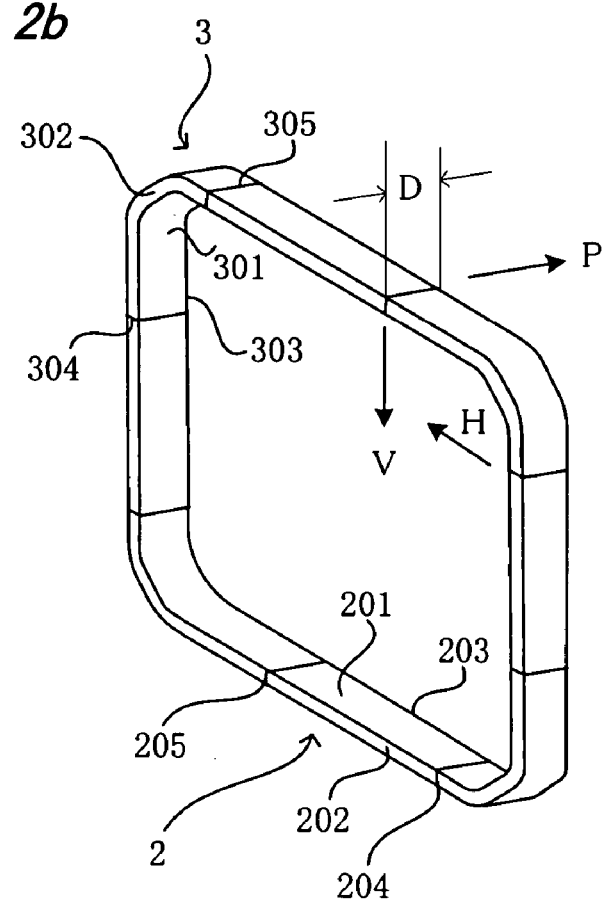
FIG. 2b is a perspective view showing a short pipe unit assembled by coupling parallelepipedic and curved segments in the circumferential direction.

The segments are also successively coupled in the pipe longitudinal direction by coupling to the segments of the pipe unit shown in FIGS. 2a and 2b. Such coupling of the segments in the circumferential and longitudinal directions is repeated until a rehabilitating pipe having a desired length is laid inside the existing pipe.

In such a segment, the outer circumferential part of the segment opposing the existing pipe is nakedly exposed and, therefore, if the existing pipe is severely damaged or if the existing pipe is a large diameter pipe, the external shock will directly impact the filler and the rehabilitating pipe will be damaged, even if the filler is filled in each segment when assembling them as the rehabilitating pipe. Therefore, in the invention, a rehabilitating plate is integrally attached to the segment. The following explains the segment based on the arcuate segment 1 as shown in FIG. 1 and FIG. 2a, but the present invention may also be applied to parallelepipedic or bent segments 2, 3, as shown in FIG. 2b.

Figure 3:
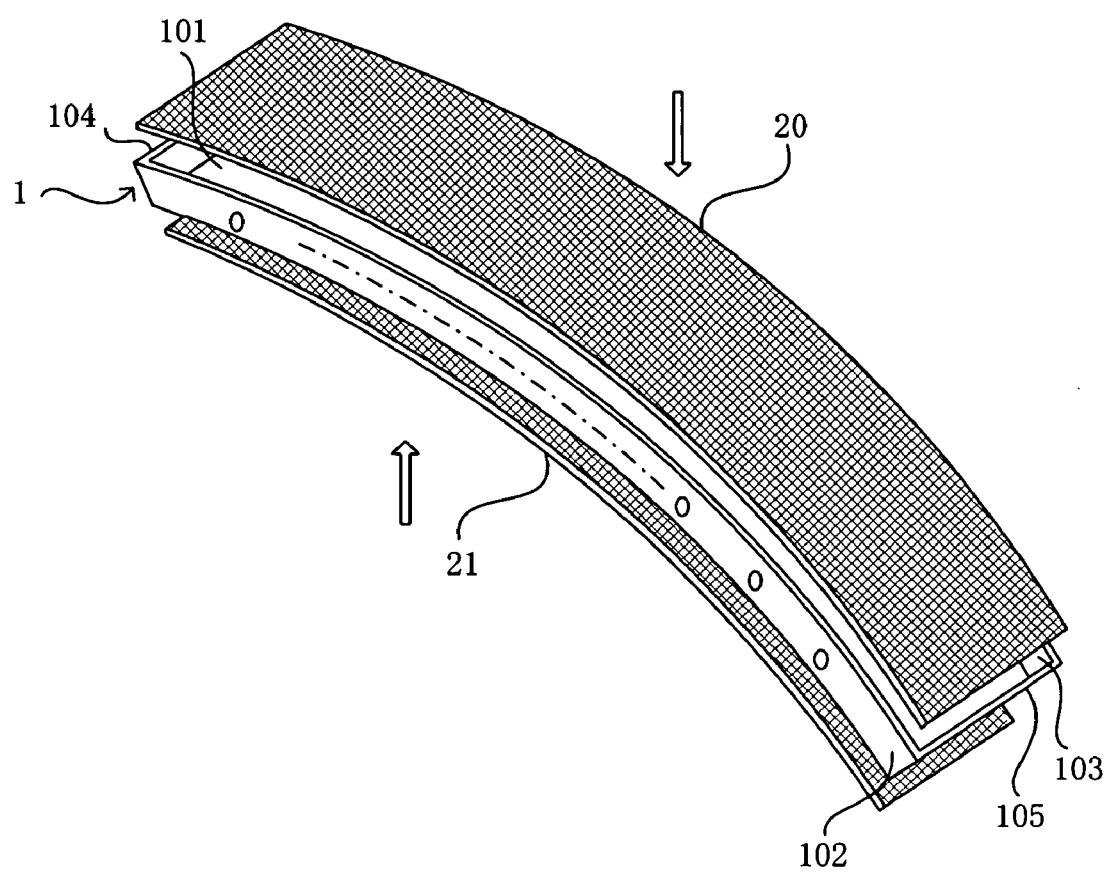
FIG. 3 is a perspective view showing how resin sheets are affixed to the segment.

In the embodiment, as shown in FIG. 3, the entire outer circumferential part of the segment 1 is covered by the rehabilitating plate, comprising a resin sheet 20, and the entire inner circumferential surface of the inner plate 101 is also covered by the rehabilitating plate, comprising a resin sheet 21 preferably having material properties the same as the resin sheet 20.

The resin sheets 20, 21 each comprises a thermosetting type reinforced plastic composed of reinforced fibers impregnated with, for example, a thermosetting resin and a curing agent; glass fibers, carbon fibers, metal fibers, organic fibers, or natural fibers are used as the reinforced fibers. In addition, the curing agent has an effect that reacts the thermosetting resin with a radical; organic peroxide, such as benzoyl peroxide and lauroyl peroxide is used as the curing agent; and an unsaturated polyester resin, an epoxy (meth) acrylate resin, and the like is used as the thermosetting resin.

The resin sheet 20 having a size the same as the entire outer circumferential part of the segment is laid onto and tightly sealed to the upper part of each of the side plates 102, 103 of the segment 1 and to the upper part of each of the end plates 104, 105, as shown in FIG. 3, and the resin sheet 21 having a size the same as the entire inner circumferential surface of the segment is tightly sealed to the inner circumferential surface of the inner plate 101. When thermal treatment is subsequently performed, the resin sheets 20, 21 are joined to the segment 1 by the hardening of the thermosetting resin, thus integrating with the segment in a form wherein the segment 1 is hermetically sealed. The resin sheets 20, 21 are extremely strong, and have strong corrosion resistance, therefore remarkably raising the strength and the corrosion resistance of the segment.

In the embodiment in FIG. 3, the segment is covered by using both resin sheets 20, 21. If, however, the segment has high strength, then it is also possible to provide just one of the resin sheets on the segment, e.g., just covering the outer circumferential part of the segment with the resin sheet 20, or just covering the inner circumferential surface of the segment with the resin sheet 21.

The assembly of the rehabilitating pipe, using segments covered with resin sheets 20, 21 in this manner, is performed as below.

Figure 4:
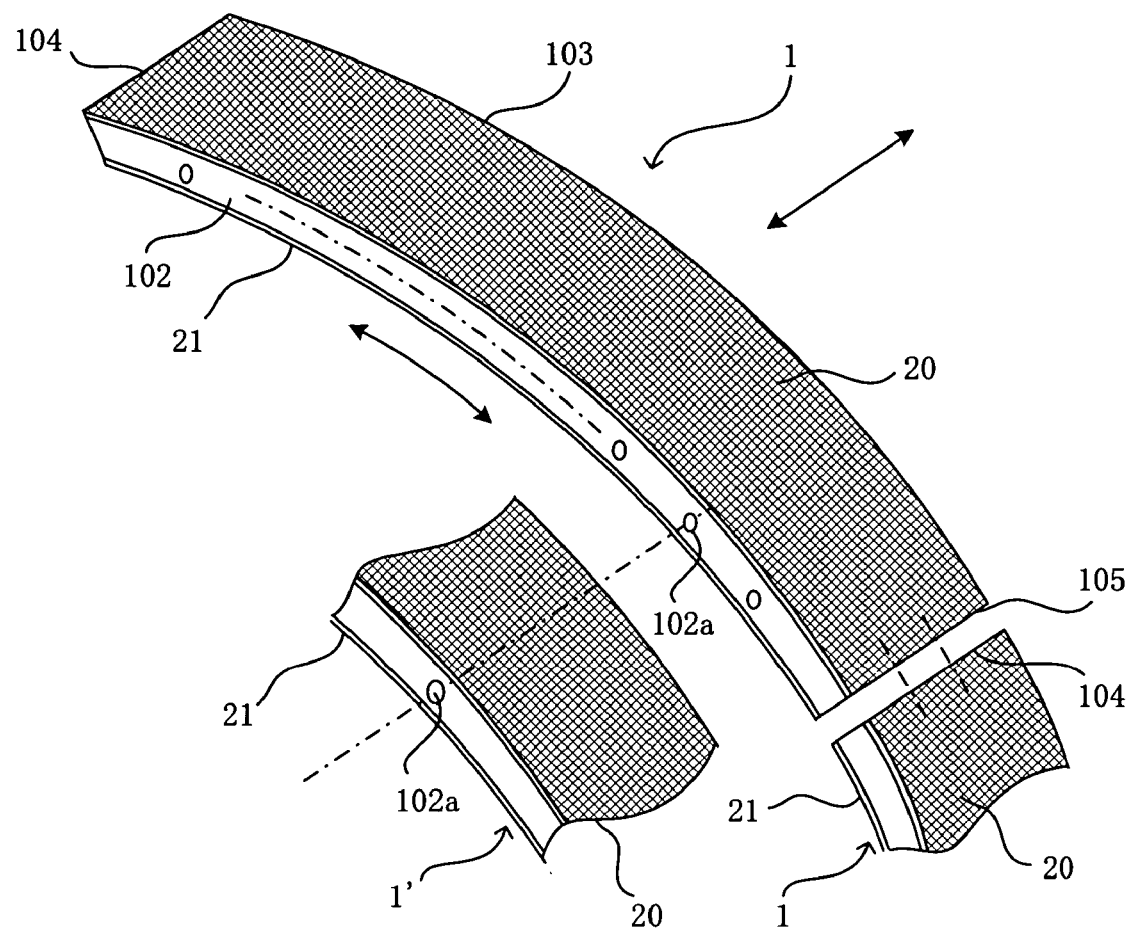
FIG. 4 is a perspective view showing how the segments, to which resin sheets have been affixed, are coupled in the circumferential direction and the pipe longitudinal direction.

First, segments 1 previously covered with resin sheets 20, 21 are carried inside the existing pipe and successively coupled in the circumferential direction, as shown in FIG. 4. Furthermore, an opening having a shape the same as the portion corresponding to the opening 101a of the inner plate 101 is formed beforehand in the resin sheet 21.

Figure 5:
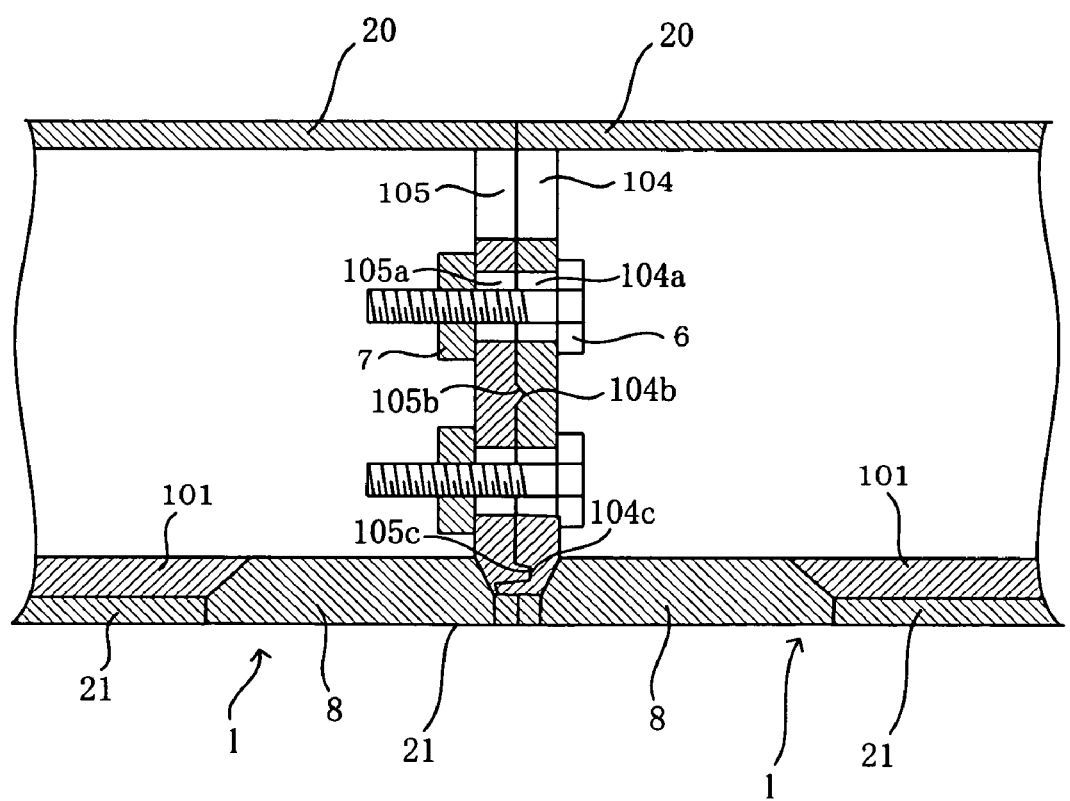
FIG. 5 is a longitudinal side view showing a state wherein the segments are mutually coupled in the circumferential direction.

This coupling in the circumferential direction is performed, as shown in detail in FIG. 5, by positioning each segment 1 so that all the resin sheets 20, 21 respectively form the same surface and so that the outer surfaces of all the side plates 102 form the same surface and the outer surfaces of all the side plates 103 form the same surface; tightly sealing the outer surfaces of the end plates 104 and 105 of all segments 1; inserting bolts 6 into the through holes 104a, 105a from the opening of the resin sheet 21 and from the opening 101a of the inner plate 101; screwing on nuts 7; and tightening both end plates 104, 105.

Furthermore, recessed parts 104b, 104c are formed across the entire length of an end plate 104 in the pipe longitudinal direction, and protruding parts 105b, 105c, which respectively interfit with those recessed parts, are formed across the entire length of an end plate 105 in the pipe longitudinal direction, thereby facilitating the work of positioning and tightly sealing both segments during coupling. By coating the interfitted part with a sealing material (not shown) beforehand, the watertightness of the coupled part can be enhanced more. When the coupling is complete, a cover 8 and the like tightly seal each opening of the inner plate 101 and each opening of the resin sheet 21. At this time, the inner circumferential surface of the cover is continuous with the inner circumferential surface of each inner plate, thus forming a uniform inner circumferential surface. Furthermore, after coupling in the circumferential direction, the resin sheet 21 can also cover the inner circumferential surface of the inner plate 101. In this case, there is no need to provide openings in the resin sheet for introducing the bolts and nuts.

Figure 6:
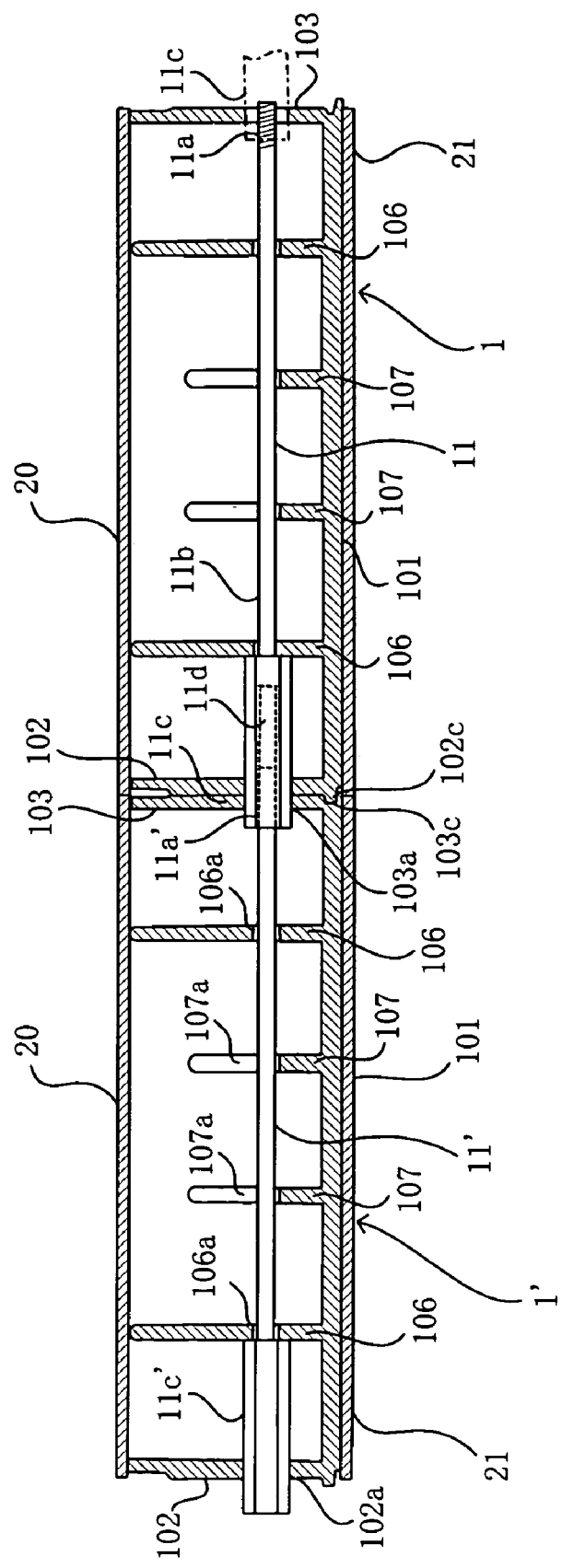
FIG. 6 is a radial cross-sectional view showing a state wherein the segments are mutually coupled in the pipe longitudinal direction using coupling members.

After the circumferentially coupled segments 1 form a ring shaped pipe unit as shown in FIG. 2a or after a prescribed number of segments in accordance with the shape of the existing pipe are coupled in the circumferential direction, another segment 1' is coupled to the circumferentially coupled segment 1 as shown in FIG. 6 to extend the rehabilitating pipe in the pipe longitudinal direction.

The coupling in the pipe longitudinal direction is performed by using a coupling member 11 made of a metal that integrally joins a rod 11b with both end parts, one end part comprising a screw part 11a, and the other end part comprising a nut part 11c wherein a screw hole 11d is formed into which the screw part 11a is screwed, as shown in FIG. 6.

In FIG. 6, the coupling member 11 on the right side is already joined to the nut part 11c of another coupling member, shown by the chain line, and fixed to the segment 1. To couple another segment 1' to this segment 1 in this state, both segments 1, 1' are first positioned so that the resin sheets 20 on the outer circumferential part of the segments align and the resin sheets 21 on the inner circumferential surface of the inner plates also align. The outer surfaces of the side plates 102 and 103 of both segments 1, 1', are then tightly sealed and the nut part 11c protruding from the side plate 102 of the segment 1 is interfitted with a through hole 103a of the side plate 103 of the segment 1'. Subsequently, the coupling member 11' is inserted to pass through a through hole 102a of the side plate 102 of the segment 1', and a screw part 11a' thereof is screwed into the screw hole 11d of the nut part 11c of the coupling member 11. When a nut part 11c' of the coupling member 11' is screwed in and it makes contact with a reinforcing plate 106 of the segment 1', the coupling member 11' clamps the segment 1' against the segment 1, thereby coupling both segments 1 and 1'. The coupling of each segment is performed using, e.g., four, coupling members per segment, and both segments 1, 1' are coupled rigidly in the pipe longitudinal direction.

For this coupling in the pipe longitudinal direction, there is a method that aligns each end plate of each segment, and there is a method that offsets each end plate of each segment. In the former method, the segment to be coupled is positioned so that its end plate is aligned with the end plate of a previously coupled segment; in the latter method, the segment to be coupled is positioned so that its end plate is offset with respect to the end plate of a previously coupled segment. If coupling with each end plate aligned, the end plates of all segments form a line extending continuously in the pipe longitudinal direction; if offsetting as in the latter case, that line is aligned every other segment in the pipe longitudinal direction.

Furthermore, across the entire perimeter in the circumferential direction of each side plate a protruding line 102c is formed in the side plate 102 of the segment and a recessed line 103c that interfits thereto is formed in the side plate 103 of the segment. This facilitates the work of positioning and tightly sealing both segments during coupling in the pipe longitudinal direction. In addition, by coating the interfitting part with a sealing material (not shown) beforehand, the watertightness of the coupled part can be increased.

When the segment 1 in FIG. 6 is the initial segment in the pipe longitudinal direction, the coupling member as shown in the figure cannot be used, and therefore a fixing member having a structure the same as the nut part 11c that can be fixed to the segment 1 by some means is used as the coupling member.

With every coupling of the segments in the circumferential direction, every coupling of the segments in the pipe longitudinal direction, after coupling a prescribed number of the segments, or after coupling all of the segments, a filler material is poured inside each segment 1 in order to increase strength. Because through holes for the coupling members are formed in the side plates, this pouring is performed via these through holes. It is also acceptable to provide pouring holes at separate locations of the segment for the purpose of this pouring. Because the segments are in mutual communication via the through holes for the coupling members, the filler material can be filled uniformly in each segment.

As the filler a resin mortar, a cement mortar or the like is used. The resin mortal is, for example, a radical polymer thermosetting resin such as an unsaturated polyester resin mixed with an inorganic aggregate, such as aluminum hydroxide, calcium silica carbonate, glass powder, and silica sand, or an organic aggregate, such as polymer beads.

The above process successively couples the segments at only one side of the existing pipe in the pipe longitudinal direction (single sided coupling), but it is also possible to successively couple at both sides in the pipe longitudinal direction (bilateral coupling). In this case, the pipe laying time can be reduced because the segments can be coupled from both sides.

Figure 7:
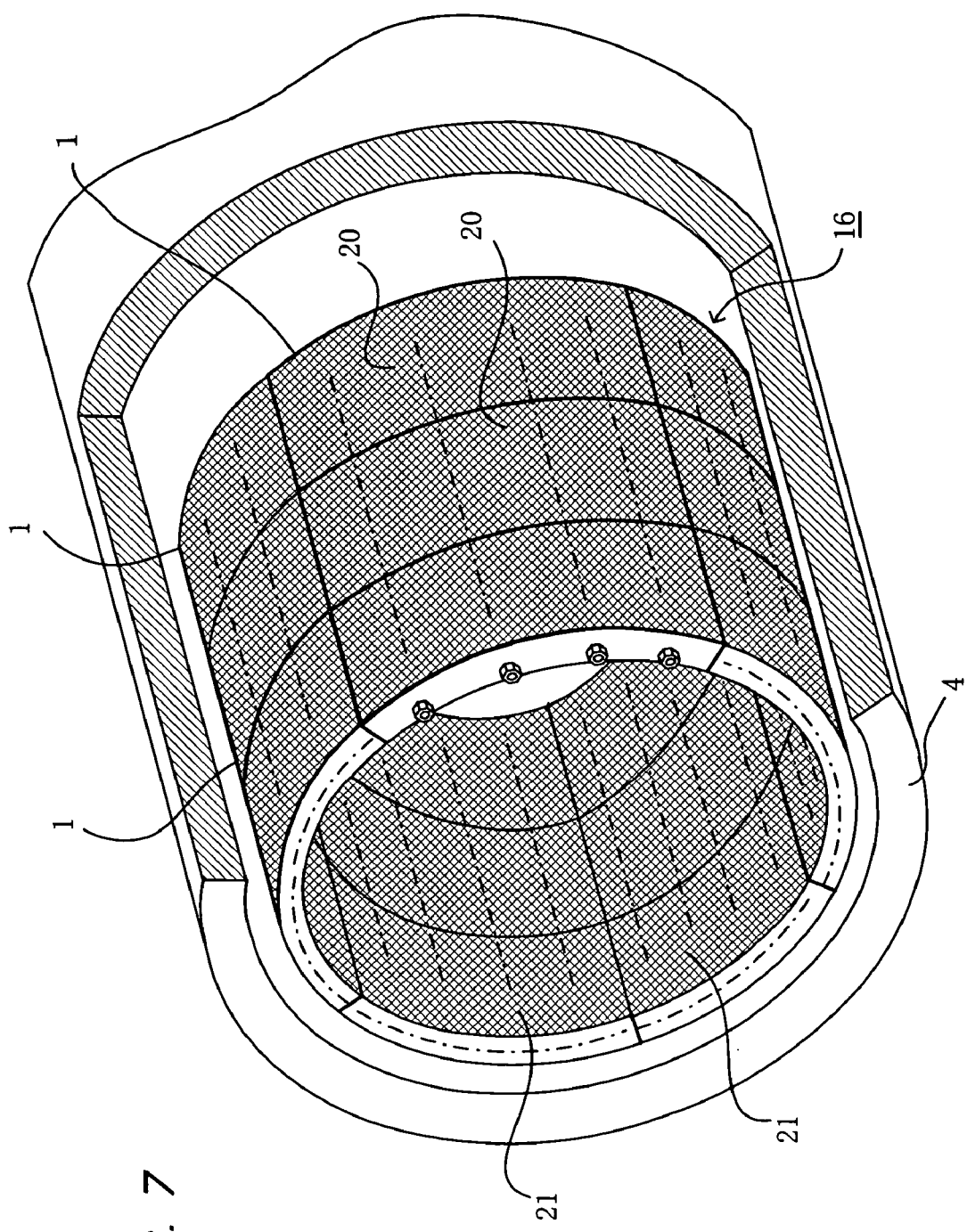
FIG. 7 is a partially broken perspective view showing a state wherein the segments are coupled inside the existing pipe to provide a rehabilitating pipe.

In so doing, the segments 1 can be mutually and successively coupled in the circumferential direction and the pipe longitudinal direction inside the existing pipe 4, as shown in FIG. 7, and assembled as the rehabilitating pipe 16. After completion of the pipe laying, the gap between the existing pipe 4 and the rehabilitating pipe 6 is filled with grout, hardened, and integrated with the existing pipe as a compound pipe. Furthermore, in FIG. 7, the coupled segments 1 are shown in a simplified form as a simple block shape, and the insertion positions of the coupling members 11 are shown by chain lines. Furthermore, although each of the segments is coupled by aligning each of the end plates in the pipe longitudinal direction, they can also be coupled by offsetting the positions of the end plates.

Figure 8A:
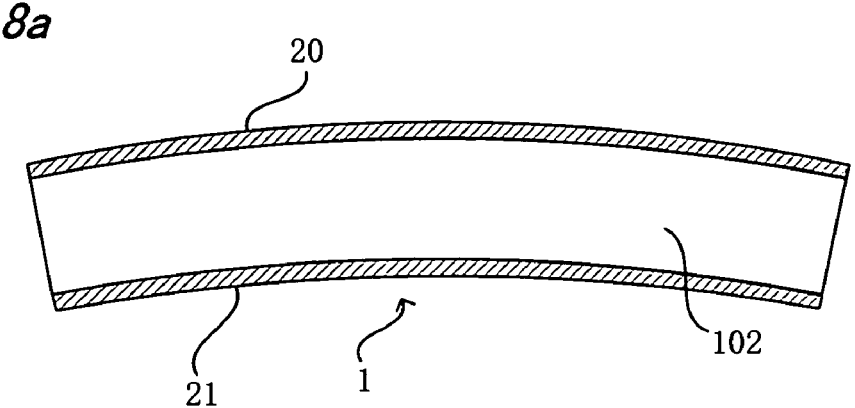
FIG. 8a is a side view of the segment in a state wherein the resin sheets are affixed.
Figure 8B:
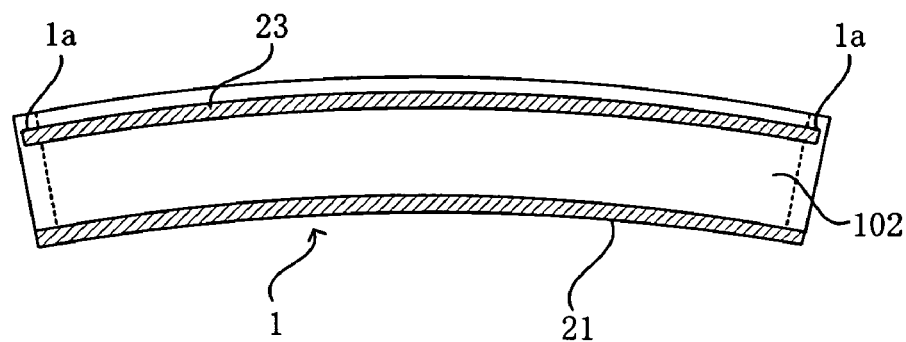
FIGS. 8b and 8c are side views of the segment in a state wherein the hardened resin sheets are inserted and fixed to the outer circumferential parts of the segment.
Figure 8C:
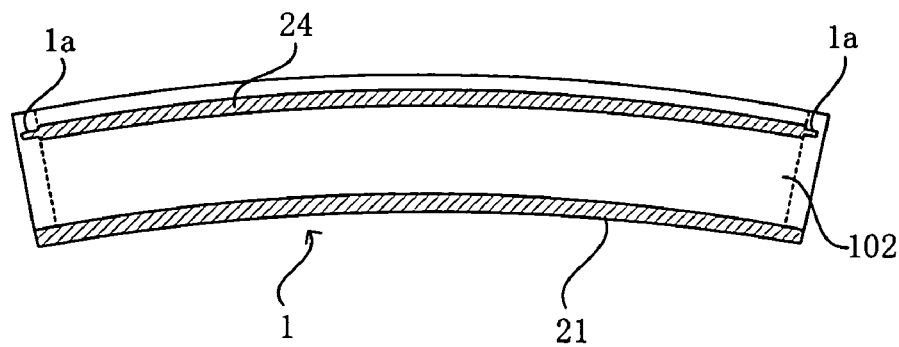

In addition to tightly sealing the resin sheet 20 to the outer circumferential part of the segment 1 and then hardening it as shown in FIG. 8a, it is also acceptable to form recessed grooves 1a in the segment 1 in the pipe longitudinal direction and insert along those recessed grooves resin sheets 23, 24, which have been previously thermal set and curved. Such embodiments are shown in FIGS. 8b and 8c.

Because the segments are strengthened after pouring in the filler, it is also possible to omit the reinforcing plates and the rib structure shown in FIG. 1, and to make a simple box shape.

As shown in FIG. 7, the resin sheets are integrally provided on each segment so that all of the resin sheets 20 of the outer circumferential surface form a uniform outer circumferential surface without any gaps, and so that all of the resin sheets 21 of the inner circumferential surface form a uniform inner circumferential surface without any gaps. Accordingly, the rigid resin sheets 20 cover the entire outer circumferential surface of the rehabilitating pipe 6 opposing the existing pipe 4, thereby absorbing shock applied to the rehabilitating pipe from the existing pipe to thereby increase the strength of the rehabilitating pipe. Further, the entire inner circumferential surface of the rehabilitating pipe 6 is covered by similar resin sheets 21, so that the resin sheets 21 of the inner circumferential surface can withstand external shock, even in the event that the resin sheets 20 on the outer circumferential side and the segments 1 should break; accordingly, the rehabilitating pipe functions not merely as a repairing pipe, but rather also as a self supporting pipe, which itself can be used as a sewer pipe and the like.

Furthermore, the coupling members 11, 11' are coupled to each other in the pipe longitudinal direction and form one long continuous steel reinforced member when the rehabilitating pipe is assembled in the pipe longitudinal direction. With such an arrangement, numerous long continuous steel reinforcing members are distributed in the circumferential direction, thereby remarkably increasing the strength of a self supporting pipe.

What is claimed is:

1. A segment for rehabilitating an existing pipe, the segment comprising: an integral structure comprised of an inner plate having an inner circumferential surface that is planar or curved with a prescribed curvature, two side plates provided upright on each side edge of the inner plate and two end plates provided upright on each end edge of the inner plate; and at least one rehabilitating plate covering one of an outer circumferential part of the segment facing the existing pipe and the inner circumferential surface of the inner plate, the rehabilitating plate being formed by a resin sheet comprised of a thermosetting-type reinforced plastic made of reinforced fibers impregnated with a thermosetting resin and a curing agent.

2. A segment as set forth in claim 1; wherein resin sheet is tightly sealed to the outer circumferential part of the segment or the inner circumferential surface of the inner plate, then hardened, and fixed to the segment.

3. A segment as set forth in claim 1; wherein the resin sheet is previously hardened and fixed to the outer circumferential part of the segment.

4. A segment as set forth in claim 1; wherein a filler material is poured inside the segment.

5. A segment as set forth in claim 1; wherein the integral structure is made of plastic.

6. A segment as set forth in claim 1; wherein the at least one rehabilitating plate comprises a pair of rehabilitating plates each covering a respective one of the outer circumferential part of the segment and the inner circumferential surface of the inner plate.

7. A rehabilitating pipe for rehabilitating an existing pipe, the rehabilitating pipe comprising: a plurality of coupling segments assembled in the circumferential and longitudinal directions of the rehabilitating pipe, each of the segments comprising an integral structure comprised of an inner plate having an inner circumferential surface that is planar or curved with a prescribed curvature. two side plates provided upright on each side edge of the inner plate and two end plates provided upright on each end edge of the inner plate; at least one rehabilitating plate covering one of an outer circumferential part of the segment facing the existing pipe and the inner circumferential surface of the inner plate, the rehabilitating pipe being formed by a resin sheet comprised of a thermosetting-type reinforced plastic made of reinforced fibers impregnated with a thermosetting resin and a curing agent; and a filler material disposed inside each of the segments.

8. A rehabilitating pipe as set forth in claim 7; wherein the resin sheet is tightly sealed to the outer circumferential part of the segment or the inner circumferential surface of the inner plate, then hardened, and fixed to the segment.

9. A rehabilitating pipe as set forth claim 7; wherein the resin sheet is previously hardened and fixed to the outer circumferential part of the segment.

10. A rehabilitating pipe as set forth in claim 7; wherein when the segments are coupled to form the rehabilitating pipe, the rehabilitating plates cover the respective outer circumferential parts of the segments to form a uniform outer circumferential surface of the rehabilitating pipe without any gaps therebetween or the rehabilitating plates cover the respective inner circumferential surfaces of the inner plates of the segments to form a uniform inner circumferential surface of the rehabilitating pipe without any gaps therebetween.

11. A rehabilitating pipe as set forth in claim 7; wherein the integral structure of each segment is made of plastic.

12. A rehabilitating pipe as set forth in claim 7; wherein for each segment the at least one rehabilitating plate comprises a pair of rehabilitating plates each covering a respective one of the outer circumferential part of the segment and the inner circumferential surface of the inner plate.

13. A plurality of segments for forming a rehabilitating pipe for rehabilitating an existing pipe, each of the segments comprising: an integral structure having an open top side, a closed bottom side, and a plurality of connecting portions for connection to connecting portions of integral structures of other segments to form the rehabilitating pipe; a first resin sheet integrally connected to the open top side of the integral structure; and a second resin sheet integrally connected to the closed bottom side of the integral structure.

14. A plurality of segments as set forth in claim 13; wherein each of the first and second resin sheets comprises a thermosetting-type reinforced plastic made of reinforced fibers impregnated with a thermosetting resin and a curing agent.

15. A plurality of segments as set forth in claim 13; wherein the integral structure of each of the segments is formed of a single piece of material.

16. A plurality of segments as set forth in claim 15; wherein the single piece of material comprises a plastic material.

17. A plurality of segments as set forth in claim 13; wherein the integral structure of each of the segments comprises a base plate forming the closed bottom side, a pair of side plates extending from respective side edges of the base plate, and a pair of end plates extending from respective end edges of the base plate to thereby form an interior space bounded by surfaces of the base plate, side plates and end plates.

18. A plurality of segments as set forth in claim 17; wherein the first resin sheet is integrally connected to the open top side of the integral structure to thereby hermetically seal the interior space of the integral structure when the integral structure is connected to integral structures of other segments to form the rehabilitating pipe.

19. A plurality of segments as set forth in claim 17; wherein the base plate has an inner circumferential surface that is planar or curved with a prescribed curvature.

20. In combination: an existing pipe; and a plurality for segments according to claim 13 connected together to form a rehabilitating pipe for rehabilitating the existing pipe.

* * * * *